United States Patent
Pelham, Sr.

(10) Patent No.: US 9,981,211 B2
(45) Date of Patent: May 29, 2018

(54) APPARATUS FOR MAKING AND METHODS OF MAKING AND USING PARTICLE- AND FIBER-CONTAINING MATERIALS

(71) Applicant: Matthew C. Pelham, Sr., Jefferson, GA (US)

(72) Inventor: Matthew C. Pelham, Sr., Jefferson, GA (US)

( * ) Notice: Subject to any disclaimer, the term of this patent is extended or adjusted under 35 U.S.C. 154(b) by 540 days.

(21) Appl. No.: 14/659,691

(22) Filed: Mar. 17, 2015

(65) Prior Publication Data
US 2015/0258471 A1  Sep. 17, 2015

Related U.S. Application Data

(60) Provisional application No. 61/954,092, filed on Mar. 17, 2014.

(51) Int. Cl.
| | |
|---|---|
| B01D 39/08 | (2006.01) |
| D04H 1/00 | (2006.01) |
| B01D 29/23 | (2006.01) |
| B01D 46/00 | (2006.01) |

(52) U.S. Cl.
CPC ......... *B01D 29/23* (2013.01); *B01D 46/0001* (2013.01); *D04H 1/00* (2013.01)

(58) Field of Classification Search
CPC ......... B32B 25/02; B32B 25/047; B32B 9/00; B32B 9/048; D04H 1/00
USPC .... 442/29, 68, 70, 72, 73, 74, 75, 227, 237, 442/267, 284, 285, 294; 210/489
See application file for complete search history.

(56) References Cited

U.S. PATENT DOCUMENTS

| | | | | |
|---|---|---|---|---|
| 2005/0220994 | A1* | 10/2005 | Mehta | B05D 1/025 427/180 |
| 2013/0037481 | A1* | 2/2013 | Lalouch | C02F 1/001 210/435 |

* cited by examiner

*Primary Examiner* — Allison G Fitzsimmons
(74) *Attorney, Agent, or Firm* — Withers & Keys, LLC

(57) ABSTRACT

Apparatus for making particle- and fiber-containing materials, such as a filter, are disclosed. Methods of making and using particle- and fiber-containing materials, such as a filter, are also disclosed. Particle- and fiber-containing materials are further disclosed.

20 Claims, 9 Drawing Sheets

APPARATUS FOR MAKING AND METHODS OF MAKING AND USING PARTICLE- AND FIBER-CONTAINING MATERIALS

CROSS-REFERENCE TO RELATED APPLICATIONS

This patent application claims the benefit of priority to U.S. Provisional Patent Application Ser. No. 61/954,092 filed on Mar. 17, 2014 and entitled "APPARATUS FOR MAKING AND METHODS OF MAKING AND USING PARTICLE- AND FIBER-CONTAINING MATERIALS," the subject matter of which is hereby incorporated by reference in its entirety.

FIELD OF THE INVENTION

The present invention relates generally to apparatus for making particle- and fiber-containing materials. The present invention further relates to methods of making and using particle- and fiber-containing materials. The present invention even further relates to particle- and fiber-containing materials.

BACKGROUND OF THE INVENTION

There is a need in the art for improved particle- and fiber-containing articles, such as filters, methods for forming particle- and fiber-containing articles, such as filters, and apparatus for forming particle- and fiber-containing articles, such as filters.

SUMMARY OF THE INVENTION

The present invention addresses some of the shortcomings in the art by the discovery of (i) improved particle- and fiber-containing articles, such as filters, (ii) efficient methods for forming particle- and fiber-containing articles, such as filters, and (iii) new apparatus for forming particle- and fiber-containing articles, such as filters. The disclosed particle- and fiber-containing articles, in the form of filters, optimizes filtration performance by particle exclusion by the use of melt-blown extruded microfibers and provides a very high surface area of exposed particles (e.g., carbon) by handling very small particles with a very high surface area. The microfiber material (e.g., polypropylene) provides higher filtration efficiency than any other filter category with a very low pressure drop. It also provides optimal filtering capacity due to the gradient density characteristics of the manufactured filter, which cannot be achieved by any other route to manufacture. The gradient density route to manufacture, which melt-blown materials are capable of producing, may allow the production of ten different layers in a single cartridge, each with a different density. This means that, during filtration, larger particles are trapped in the outer layers of the filter and particles of gradually smaller size are trapped in the inner layers between the outside and the inside of the filter.

Accordingly, in one exemplary embodiment, the present invention is directed to an apparatus for forming a particle- and fiber-containing material, wherein the apparatus comprises: (I) a particle deposition housing, the particle deposition housing comprising a housing volume surrounded by (i) one or more housing walls, (ii) a particle inlet, (iii) a particle outlet, (iv) a housing inlet on a first side of the housing, and (v) a housing outlet on a second side, the housing inlet and outlet being separated from one another by a wall portion of the one or more housing walls and a housing volume portion of the housing volume; (II) a particle moving device, the particle moving device comprising one or more components that enable movement of free-flowing particles into the particle inlet; (III) at least one fiber deposition device positioned outside of the particle deposition housing and proximate (i) the housing inlet, (ii) the housing outlet, or (iii) both of the housing inlet and the housing outlet; and (IV) a substrate moving device, the substrate moving device comprising one or more components that enable movement of a substrate (i) thru the housing inlet, (ii) thru the housing volume portion, (iii) thru the housing outlet, and (iv) pass the at least one fiber deposition device so as to (i) deposit fibrous material onto the substrate and (ii) form a coated substrate.

The present invention is further directed to particle- and fiber-containing articles, such as filters, made using the herein-disclosed apparatus. In one exemplary embodiment, the particle- and fiber-containing article comprises a particle-containing filter comprising: an inner filter tubular member, the inner filter tubular member having a tubular member outer surface, a tubular member inner surface, and a plurality of apertures extending through the inner filter tubular member from the tubular member outer surface to the tubular member inner surface; and alternating layers of (i) fibrous material and (ii) particles along at least a portion of the tubular member outer surface. In some embodiments, the alternating layers of (i) fibrous material and (ii) particles comprise alternating layers of (i) melt-blown fibrous material and (ii) carbon particles.

The present invention is even further directed to methods of making particle- and fiber-containing articles. In one exemplary embodiment, the method of making a particle- and fiber-containing article comprises a method of making a particle- and fiber-containing material comprising: depositing fibrous material onto a substrate so as to form a fiber-coated substrate; passing the fiber-coated substrate through a particle cloud contained within a particle deposition housing to enable contact and adhesion between (i) deposited fibrous material and (ii) particles of the particle cloud; and optionally repeating each of the depositing and passing steps up to 100 times.

The present invention is also directed to methods of using particle- and fiber-containing articles. In one exemplary embodiment, the method of using a particle- and fiber-containing article comprises: passing a fluid (e.g., water, air, etc.) through the alternating layers of a filter formed via the apparatus and/or methods of the present invention. In one desired embodiment, the fluid comprises water.

These and other features and advantages of the present invention will become apparent after a review of the following detailed description of the disclosed embodiments and the appended claims.

BRIEF DESCRIPTION OF THE FIGURES

The present invention is further described with reference to the appended figure, wherein.

DETAILED DESCRIPTION OF THE INVENTION

Figure 1:
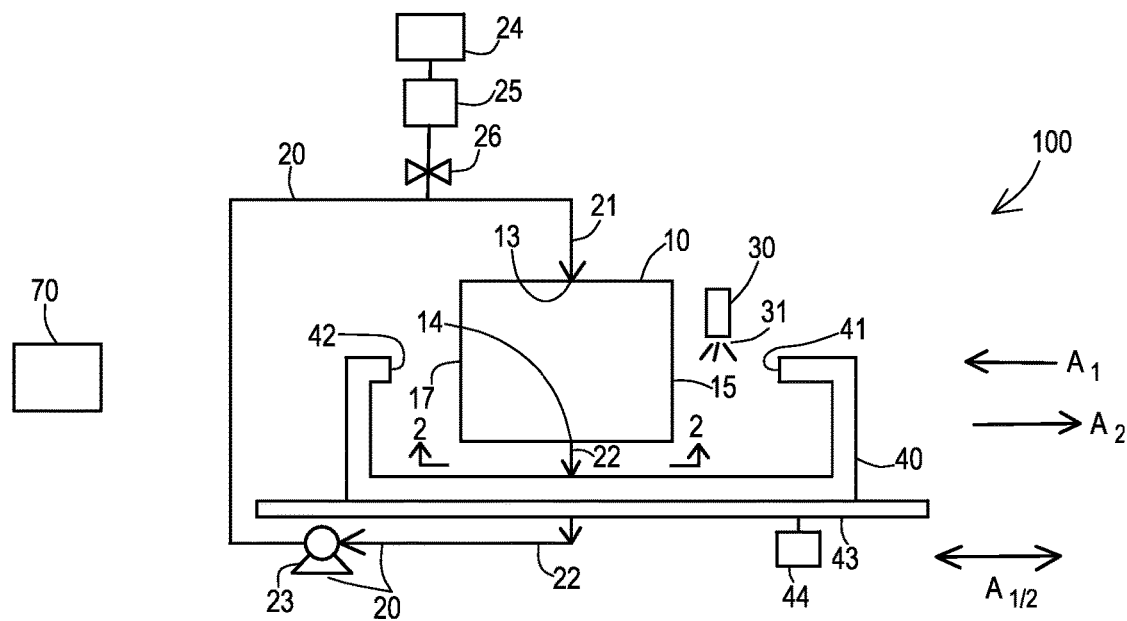
FIG. 1 depicts an exemplary apparatus of the present invention.

The present invention relates to (1) apparatus for making particle- and fiber-containing materials, (2) methods of making and using particle- and fiber-containing materials, and (3) particle- and fiber-containing materials.

The methods and apparatus of the present invention enable the introduction of a finely divided, "free-flowing" particulate (e.g., carbon particles) into a microfiber extruded substrate (e.g., a melt-blown web) at the point of formation. As used herein, the term "free-flowing" is used to describe particles that typically move independently of one another, and are not bound to one another via, for example, a resin matrix material or a liquid material (e.g., water or organic solvent). "Free-flowing" particles can be used to form a particle cloud consisting of the "free-flowing particles" and air.

In some embodiments, one or more of the following features are utilized:

finely divided carbon particles are introduced with a particle size distribution in the 1-10 micron particle size range;

the particles are introduced in a positive air flow;

the particles captured in the positive air flow are then introduced to melt-blown microfiber at the point of fiber extrusion/bonding located on the surface of the forming cartridge;

the extrusion die oscillates laterally along a fixed "x" direction axis of the forming cartridge, and/or the cartridge rotates in order to allow the uniform extrusion of thermoplastic microfiber onto cartridge surface;

the finely divided carbon particles are introduced to the cartridge filter immediately following the extrusion die tip, onto the surface of a formed cartridge filter;

conditions so as to create turbulence within the air stream in order for the particles to develop a net electrostatic charge;

air turbulence so as to enhance the adherence of finely divided particles (e.g., carbon) to the microfiber surface (i.e., it is speculated that this effect is the result of attraction between opposite charges held by the charged particle and the charged fiber surface);

an adherent effect that permanently anchors the particle to the fiber surface without the particle needing to become embedded in the fiber surface;

the particle surface is not occluded by thermoplastic binder, so the particle surface (e.g., carbon) exhibits optimal surface area for chemical adsorbance of taste and odor chemistries;

electrostatic charging of the particles also prevents particles from agglomerating on surface fibers, and ensures that a uniform distribution of finely divided particles exists on the surface of the melt-blown microfiber exposed to them;

the control of equipment and environmental contamination from finely divided particulate material (e.g., carbon) conveyed in a volume of air;

retention of the particle-containing conveyed air (e.g., carbon particle cloud) in an enclosed plenum, which surrounds the cartridge filter as shown in FIG. 8;

a vacuum applied to the enclosure (i.e., as shown in FIG. 8) to evacuate finely divided particulate material in the air stream that has not become adsorbed onto the surface of cartridge filter to which the directed air flow is being immediately addressed;

evacuated material is subsequently recycled into the air stream of freshly conveyed finely divided particulate material (e.g., carbon particles); and the melt-blown microfiber surface is continually exposed to finely divided particulate material (e.g., carbon particles).

Additional embodiments of the present invention are further described below and in the accompanying figures.

Additional Embodiments

Apparatus

1. An apparatus 100 for forming a particle- and fiber-containing material 200, said apparatus 100 comprising: a particle deposition housing 10, said particle deposition housing 10 comprising a housing volume 11 surrounded by (i) one or more housing walls 12, (ii) a particle inlet 13, (iii) a particle outlet 14, (iv) a housing inlet 15 on a first side 16 of said housing 10, and (v) a housing outlet 17 on a second side 18, said housing inlet 15 and outlet 17 being separated from one another by a wall portion 19 of said one or more housing walls 12 and a housing volume portion 120 of said housing volume 11; a particle moving device 20, said particle moving device 20 comprising one or more components (e.g., components 21/22/23/24/25/26 discussed below) that enable movement of free-flowing particles 61 into said particle inlet 13; at least one fiber deposition device 30 positioned outside of said particle deposition housing 10 and proximate (i) said housing inlet 15, (ii) said housing outlet 17, or (iii) both of said housing inlet 15 and said housing outlet 17; and a substrate moving device 40, said substrate moving device 40 comprising one or more components (e.g., components 41/42/43/44 discussed below) that enable movement of a substrate 50 (i) thru said housing inlet 15, (ii) thru said housing volume portion 120, (iii) thru said housing outlet 17, and (iv) pass said at least one fiber deposition device 30 so as to (i) deposit fibrous material 62 onto the substrate 50 and (ii) form a coated substrate 60.

Figure 2:
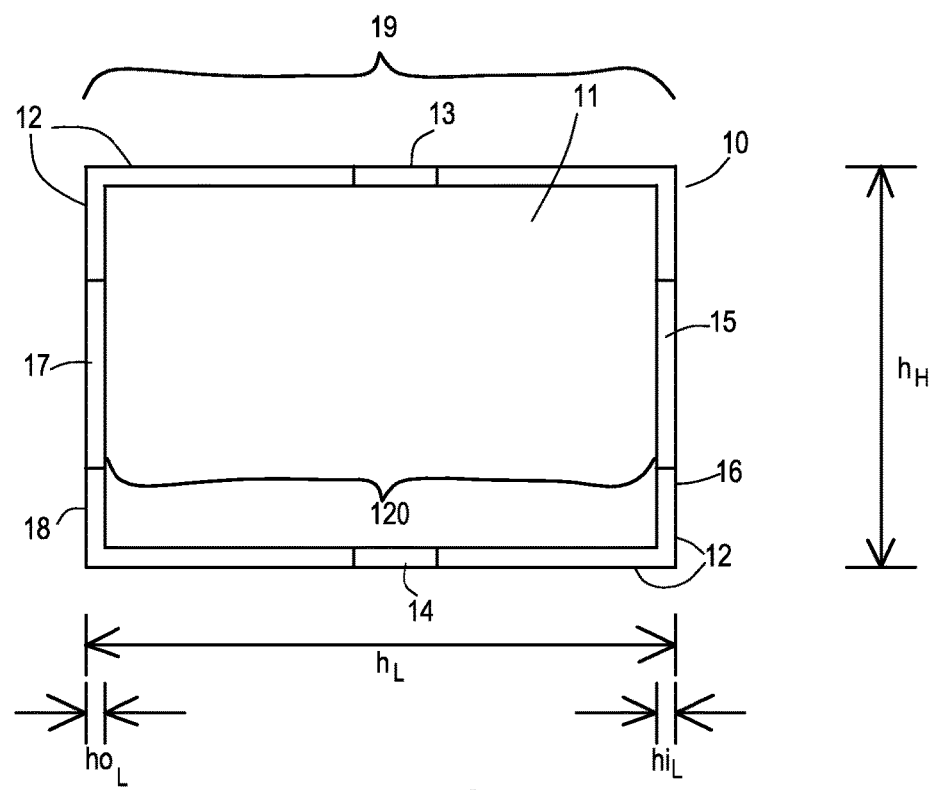
FIG. 2 depicts a cross-sectional view of the exemplary particle deposition housing shown in the exemplary apparatus of FIG. 1 as viewed along line 2-2 shown in FIG. 1.
Figure 3:
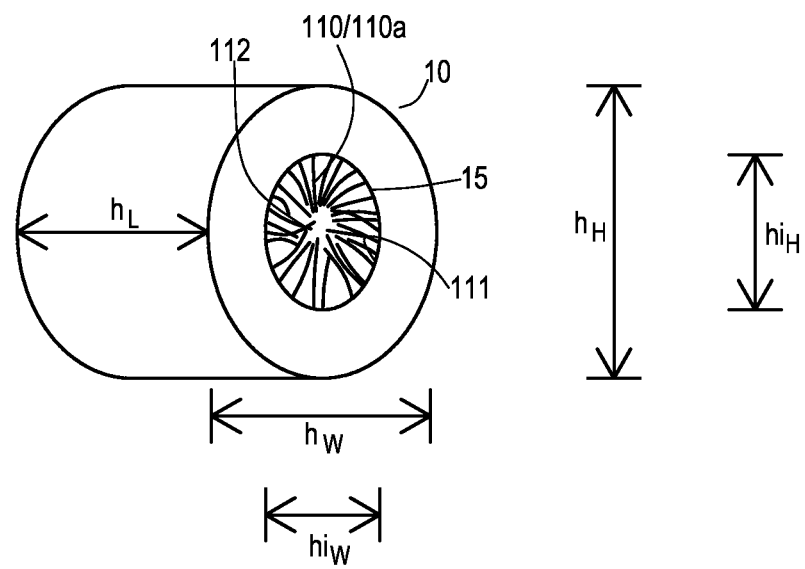
FIG. 3 depicts a perspective view of the exemplary particle deposition housing shown in the exemplary apparatus of FIG. 1 so as to view an exemplary housing inlet of the exemplary particle deposition housing.
Figure 4A:
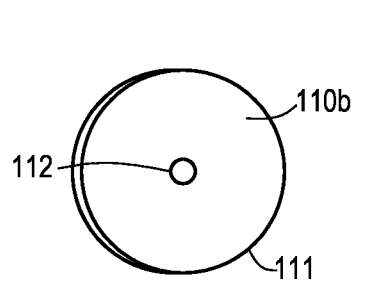
FIGS. 4a-4b depict alternative aperture-forming barrier materials suitable for use within the exemplary housing inlet shown in FIG. 3 (and a housing outlet, not shown)
Figure 4B:
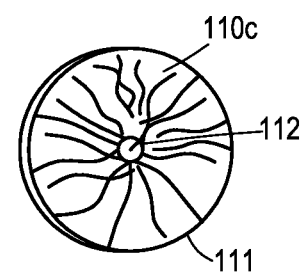

2. The apparatus 100 of embodiment 1, wherein said particle deposition housing 10 comprises a housing length $h_L$ of up to about 2.0 meters (m), a housing width $h_W$ of up to about 2.0 m, and a housing height $h_H$ of up to about 100 centimeters (cm), and said housing inlet 15 is separated from said housing outlet 17 by said housing length $h_L$. See, for example, FIGS. 2-3. It should be noted that although exemplary particle deposition housing 10 is shown in FIGS. 1-3 as having a circular cross-sectional configuration as measured within a plane extending in the housing width $h_W$ and housing height $h_H$ directions, particle deposition housing 10 may have any cross-sectional shape and configuration. For example, particle deposition housing 10 may have an overall spherical shape, an overall cylindrical shape, an overall rectangular shape, and overall square shape, etc. depending, for example, on the size and shape of substrate 50.

3. The apparatus 100 of embodiment 1 or 2, wherein said particle deposition housing 10 comprises a housing length $h_L$ of from about 10 cm to about 200 cm, a housing width $h_W$ of from about 10 cm to about 200 cm, and a housing height $h_H$ of from about 10 cm to about 200 cm, and said housing inlet 15 is separated from said housing outlet 17 by said housing length $h_L$.

4. The apparatus 100 of any one of embodiments 1 to 3, wherein each of said housing inlet 15 and said housing outlet 17 is lined with an aperture-forming barrier material 110, said aperture-forming barrier material 110 comprising (i) a barrier material outer periphery 111 bound to said particle deposition housing 10 and (ii) an aperture-forming portion 112 surrounded by said barrier material outer periphery 111. See, for example, FIGS. 3-4b and 11-13.

5. The apparatus 100 of embodiment 4, wherein said aperture-forming barrier material 110 comprises a plurality of brush bristles 110a lining each of said housing inlet 15 and said housing outlet 17. See, for example, FIGS. 3 and 11-13.

6. The apparatus 100 of embodiment 4, wherein said aperture-forming barrier material 110 comprises a polymeric membrane (i.e., possibly an elastomeric material, thermoplastic material, or both) 110b lining each of said housing inlet 15 and said housing outlet 17. See, for example, FIG. 4a.

7. The apparatus 100 of embodiment 4, wherein said aperture-forming barrier material 110 comprises a fabric material 110c lining each of said housing inlet 15 and said housing outlet 17. See, for example, FIG. 4b.

Figure 8:
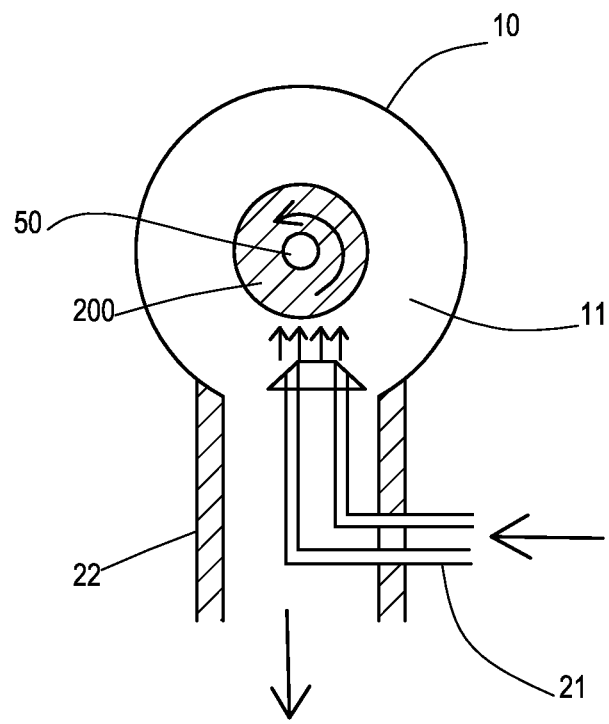
FIG. 8 depicts a cross-sectional end view of another exemplary particle deposition housing with an exemplary substrate therein.
Figure 9:
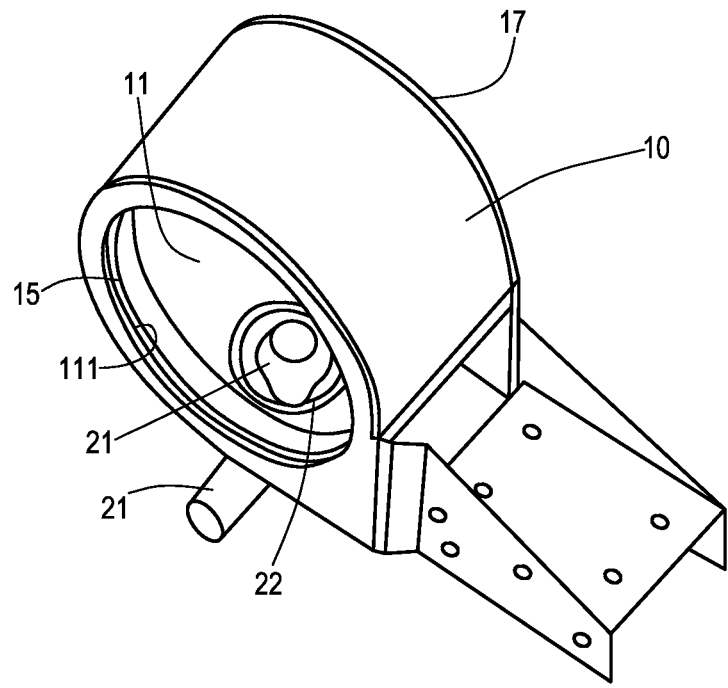
FIG. 9 depicts a perspective view of another exemplary particle deposition housing with an annular configuration of a particle inlet and particle outlet.
Figure 10:
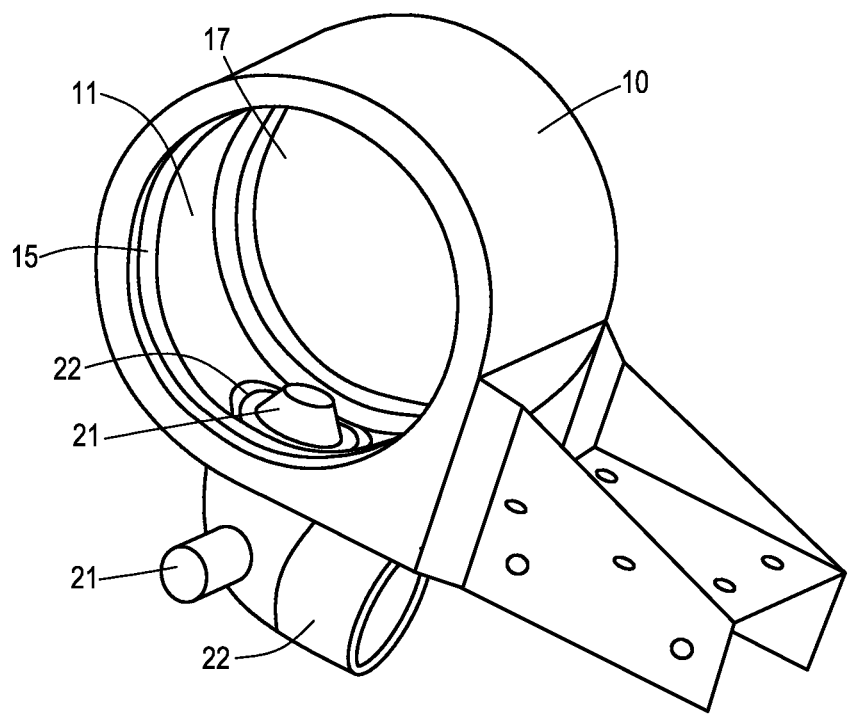
FIG. 10 depicts a side view of the exemplary particle deposition housing shown in FIG. 9.
Figure 11:
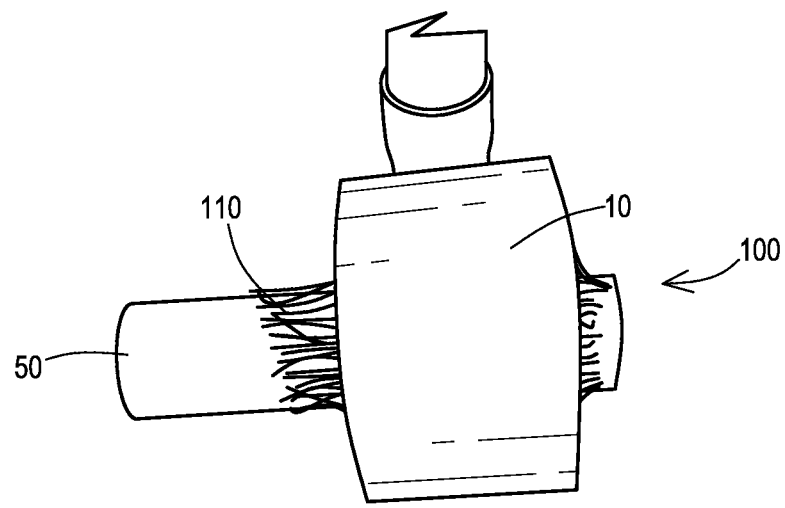
FIG. 11 provides a view of an exemplary particle deposition housing with a substrate extending therethrough.
Figure 12:
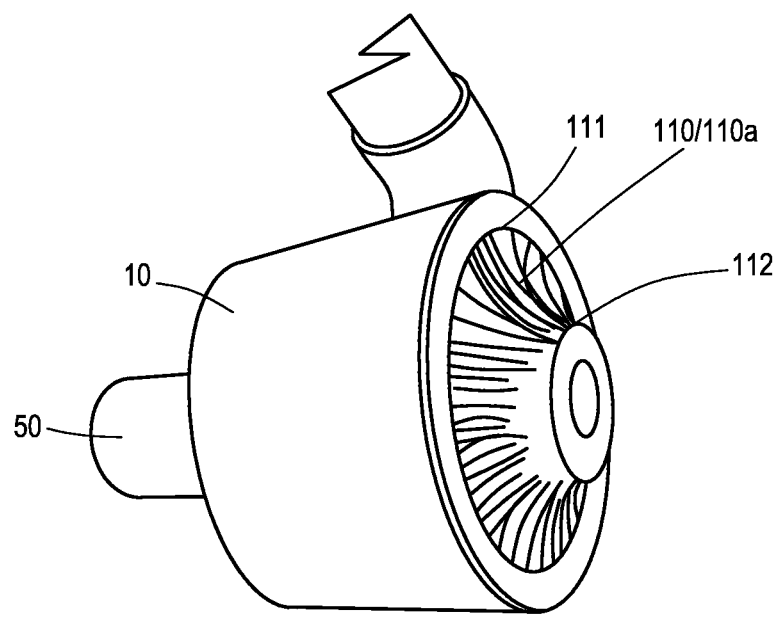
FIG. 12 provides another view of the exemplary particle deposition housing shown in FIG. 11.
Figure 13:
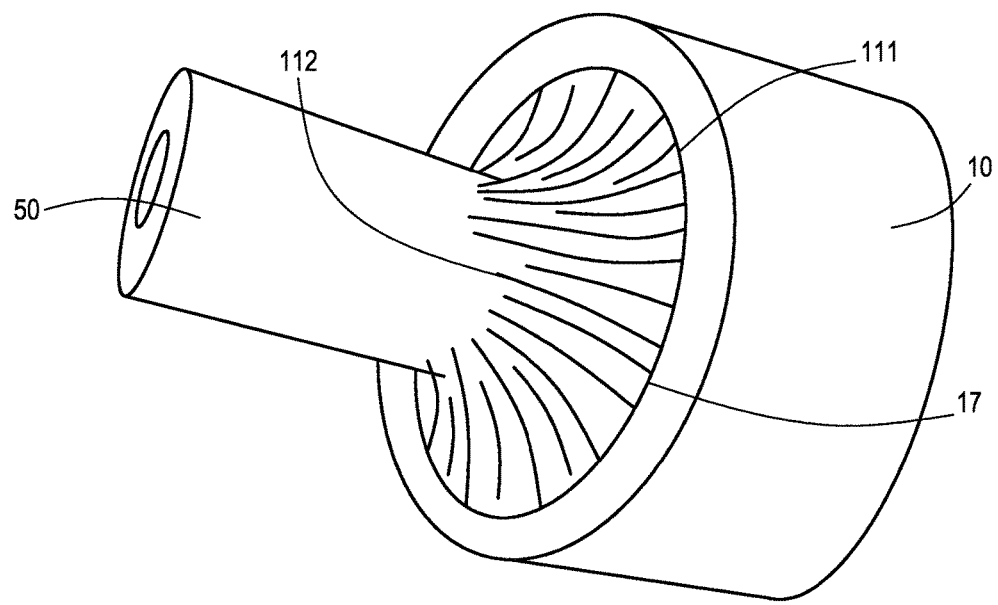
FIG. 13 provides a close-up view of the exemplary particle deposition housing shown in FIG. 11.

8. The apparatus 100 of any one of embodiments 1 to 7, wherein each of said housing inlet 15 and said housing outlet 17 comprises an outlet or inlet length ($ho_L$ or $hi_L$) of from about 0.1 cm to about 100 cm, an outlet or inlet width ($ho_W$ or $hi_W$) of from about 0.1 cm to about 100 cm, and an outlet or inlet height ($ho_H$ or $hi_W$) of from about 0.1 cm to about 100 cm. See, for example, FIGS. 2-3. The housing inlet 15 and outlet 17 are also capable of being mounted as a concentric "annular" assembly with the inlet 15 and outlet 17 possessing the same axis. See, for example, FIGS. 8-10. In this case, the inlet 15 is smaller in diameter than the outlet 17. The inlet 15 and outlet 17 are also preferentially placed at the bottom of the housing 10 so that the vacuum applied to the outlet 17 removes excess particles.

9. The apparatus 100 of any one of embodiments 1 to 8, wherein said particle moving device 20 comprises one or more components that enable movement of free-flowing particles 61 into said particle inlet 13 and out of said particle outlet 14.

10. The apparatus 100 of any one of embodiments 1 to 9, wherein said particle moving device 20 comprises (i) first conduit 21 connected to said particle inlet 13 and (ii) a second conduit 22 connected to said particle outlet 14.

11. The apparatus 100 of embodiment 10, wherein said first and second conduits 21/22 form a continuous loop of conduit. See, for example, FIG. 1.

Figure 17:
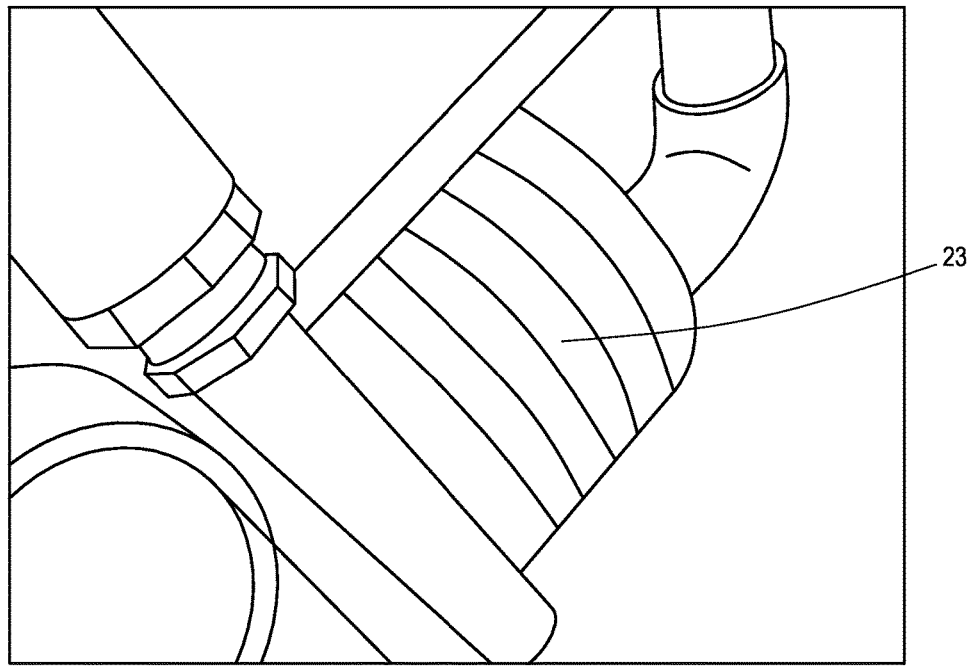
FIG. 17 provides a view of an exemplary motor-driven multi-fan unit suitable for use in the exemplary apparatus shown in FIG. 1.

12. The apparatus 100 of any one of embodiments 1 to 11, wherein said particle moving device 20 comprises a motor-driven multi-fan unit 23 capable of moving a particle cloud (not shown) into said particle inlet 13. See, for example, FIGS. 1 and 17.

13. The apparatus 100 of any one of embodiments 10 to 12, wherein said particle moving device 20 comprises a motor-driven multi-fan unit 23 capable of moving a particle cloud through said first and second conduits 21/22.

Figure 16:
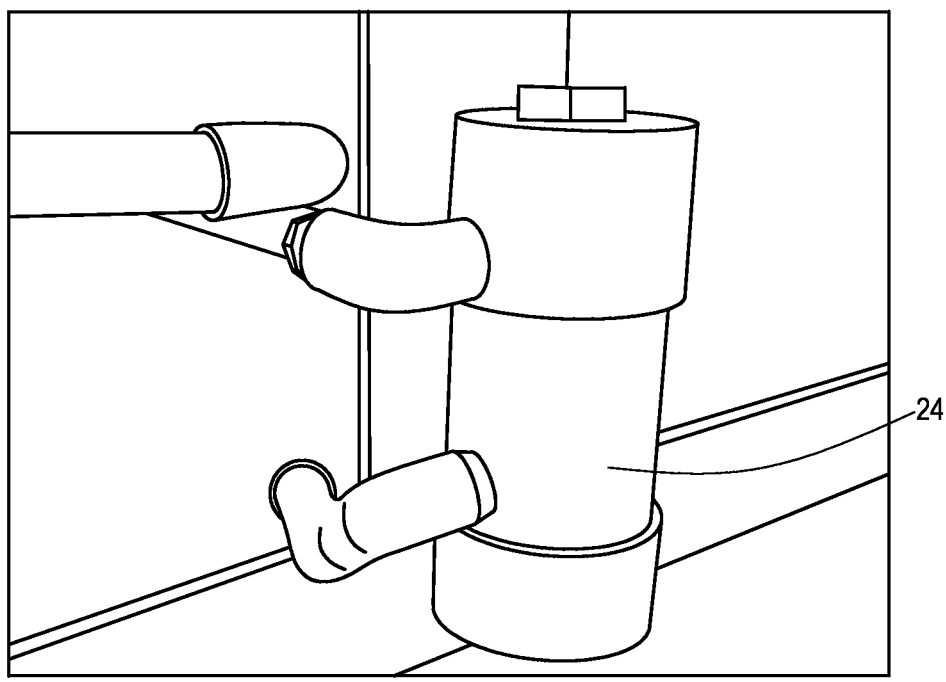
FIG. 16 provides a view of an exemplary particle storage housing suitable for use in the exemplary apparatus shown in FIG. 1.

14. The apparatus 100 of any one of embodiments 1 to 13, wherein said particle moving device 20 comprises a particle storage housing 24, said particle storage housing 24 being connectable to said apparatus 100 so as to be in fluid communication with said particle inlet 13. See, for example, FIGS. 1 and 16.

15. The apparatus 100 of any one of embodiments 1 to 14, wherein said particle moving device 20 comprises a particle storage housing 24, said particle storage housing 24 being connected to said apparatus 100 so as to be in fluid communication with said particle inlet 13.

16. The apparatus 100 of any one of embodiments 10 to 15, wherein said particle moving device 20 comprises a particle storage housing 24 in fluid communication with said first conduit 21.

Figure 14:
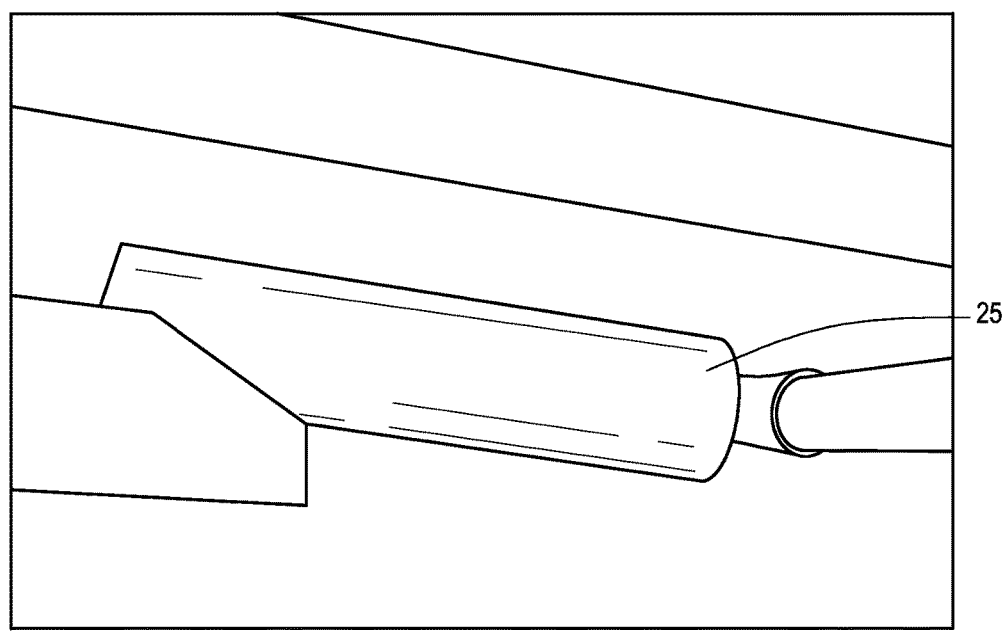
FIG. 14 provides a view of an exemplary heater suitable for use in the exemplary apparatus shown in FIG. 1.

17. The apparatus 100 of any one of embodiments 14 to 16, wherein said particle moving device 20 further comprises a particle heater 25, said particle heater 25 being positioned to heat particles 61 within said particle storage housing 24 or at a location between said particle storage housing 24 and said particle inlet 13. See, for example, FIGS. 1 and 14.

Figure 15:
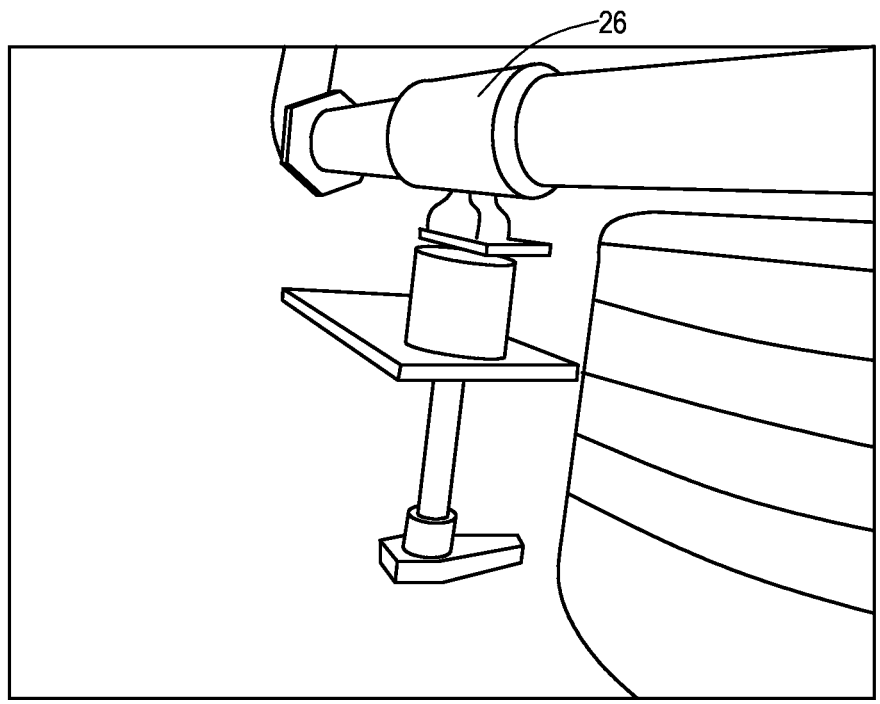
FIG. 15 provides a view of an exemplary valve system suitable for use in the exemplary apparatus shown in FIG. 1.

18. The apparatus 100 of any one of embodiments 14 to 17, wherein said particle moving device 20 further comprises a particle valve 26, said particle valve 26 being positioned at a location between said particle storage housing 24 and said particle inlet 13. See, for example, FIGS. 1 and 15.

19. The apparatus 100 of any one of embodiments 1 to 18, wherein said at least one fiber deposition device 30 is positioned proximate said housing inlet 15.

20. The apparatus 100 of any one of embodiments 1 to 19, wherein said at least one fiber deposition device 30 comprises one or more fiber-extruding dies 31.

21. The apparatus 100 of any one of embodiments 1 to 20, wherein said at least one fiber deposition device 30 comprises one or more melt-blown fiber dies 31.

22. The apparatus 100 of any one of embodiments 1 to 21, wherein said at least one fiber deposition device 30 comprises a single melt-blown fiber die 31.

Figure 18:
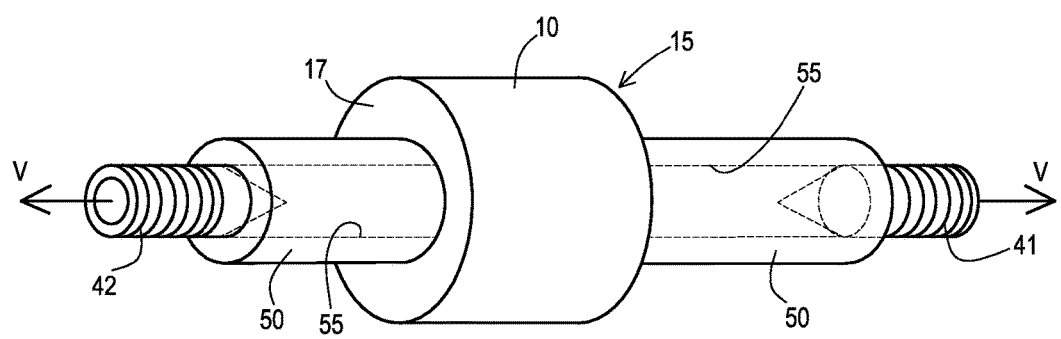
FIG. 18 depicts an exemplary substrate moving system suitable for use in the exemplary apparatus shown in FIG. 1.

23. The apparatus 100 of any one of embodiments 1 to 22, wherein said substrate moving device 40 comprises one or more components that enable movement of a substrate 50 in a single direction $A_1$. See, for example, FIGS. 1 and 18.

24. The apparatus 100 of any one of embodiments 1 to 22, wherein said substrate moving device 40 comprises one or more components that enable movement of a substrate 50 in a first direction $A_1$ and in a second direction $A_2$, said second direction $A_2$ being opposite said first direction $A_1$. See, for example, FIG. 1.

25. The apparatus 100 of any one of embodiments 1 to 24, wherein said substrate moving device 40 comprises substrate connecting components 41/42, said substrate connecting components 41/42 being capable of connecting to opposite ends 51/52 of a substrate 50. As shown in FIG. 1, substrate moving device 40 may comprise (i) a track 43 on which substrate moving device 40 moves, and (ii) a motor 44 capable of moving substrate moving device 40 along track 43.

26. The apparatus 100 of any one of embodiments 1 to 25, wherein said substrate moving device 40 further enables rotation of the substrate 50 along an axis 53 extending (i) thru the substrate 50 and along a length direction of the substrate 50, (ii) thru said housing inlet 15, (iii) thru said housing volume portion 120, and (iv) thru said housing outlet 17. As further shown in FIG. 18, substrate connecting components 41/42 may further comprise components, which apply a vacuum to an interior portion of substrate 50. In this embodiment, the applied vacuum enhances particle 61 contact with particle- and fiber-containing material 200 positioned along substrate 50 (i.e., the vacuum forcibly draws particles 61 onto particle- and fiber-containing material 200 positioned along substrate 50).

27. The apparatus 100 of any one of embodiments 1 to 26, wherein said substrate 50 comprises a tubular member 50. Tubular member 50 may comprise an extruded polymer, e.g., polyethylene or polypropylene or any other material with suitable properties (i.e., structural integrity to support particle- and fiber-containing material 200).

28. The apparatus 100 of any one of embodiments 1 to 27, wherein said substrate comprises 50 a polymeric tubular member 50.

Figure 5:
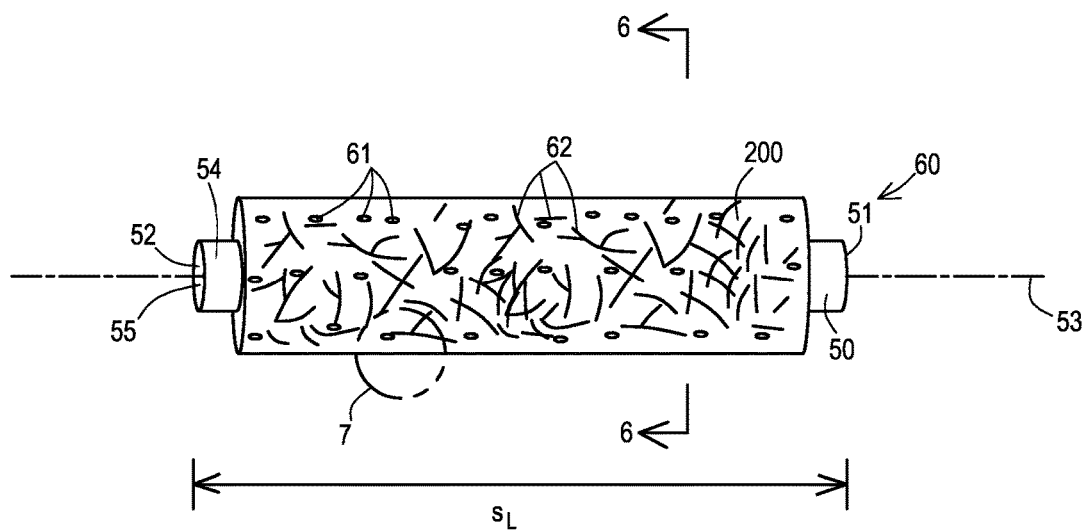
FIG. 5 depicts a view of an exemplary particle- and fiber-containing material that may be formed using the exemplary apparatus of FIG. 1.
Figure 6:
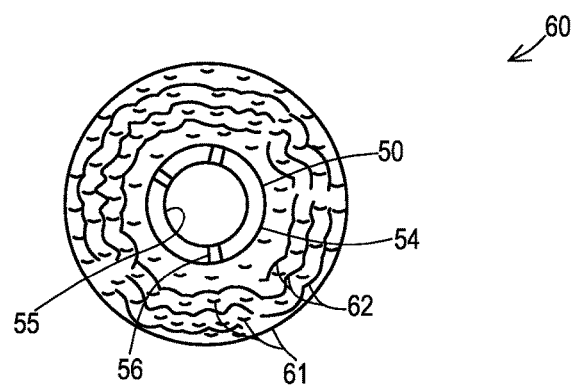
FIG. 6 depicts a cross-sectional view of the exemplary particle- and fiber-containing material shown in FIG. 5 as viewed along line 6-6 shown in FIG. 5.

29. The apparatus 100 of any one of embodiments 1 to 27, wherein said substrate 50 comprises a filter inner tubular member 50, said inner filter tubular member 50 having a tubular member outer surface 54, a tubular member inner surface 55, and a plurality of apertures 56 extending through said inner filter tubular member 50 from said tubular member outer surface 54 to said tubular member inner surface 55. See, for example, FIGS. 5-6.

30. The apparatus 100 of any one of embodiments 1 to 29, wherein said apparatus 100 applies carbon particles 61, baking soda particles 61, zeolite particles 61, cyclodextrin particles 61, polymer or copolymeric particles 61, cryogenically ground thermoplastic particles 61, e.g., copolyester or copolyamide or thermoset material particles 61, or any combination thereof onto said substrate 50. These particles 61 may have the ability to bind the fibers 62 of the particle- and fiber-containing material 200 together or help in binding other particles 61 into the structure. The particles 61 may have ion exchange characteristics and may have the ability to bind heavy metals. The particles 61 may also possess antimicrobial activity designed to assist in bio-burden reduction (e.g., silver based materials). Most important, the particles 61 are not heated and passed through a fiber extrusion die to manufacture the meltblown extruded cartridge filter. This ensures that particles 61 which possess important room temperature functionality, but are sensitive to elevated temperatures typically experienced during extrusion processing, can nonetheless be uniformly introduced into the particle- and fiber-containing material 200 structure.

31. The apparatus 100 of any one of embodiments 14 to 30, wherein said particle storage housing 24 contains carbon particles 61, baking soda particles 61, zeolite particles 61, cyclodextrin particles 61, polymer or copolymeric particles 61, cryogenically ground thermoplastic particles 61, e.g., copolyester or copolyamide or thermoset material particles 61, or any combination thereof.

32. The apparatus 100 of any one of embodiments 1 to 31, wherein said apparatus 100 applies carbon particles 61 onto said substrate 50.

33. The apparatus 100 of any one of embodiments 1 to 32, wherein said substrate moving device 40 further comprises one or more components (not shown) that enable transport of the coated substrate 60 from said particle deposition housing 10 to a coated substrate packaging device 70. See, for example, FIG. 1. Suitable components that may enable transport of coated substrate 60 from particle deposition housing 10 to coated substrate packaging device 70 may include, but are not limited to, a conveyor system, a robotic arm, a roll transport device, or any combination thereof.

34. The apparatus 100 of any one of embodiments 1 to 33, wherein said apparatus 100 further comprises one or more components (not shown) that enable packaging of the coated substrate 60.

35. The apparatus 100 of any one of embodiments 1 to 34, wherein the coated substrate 60 is a particle-containing filter 60.

Particle-Containing Filters

36. A particle-containing filter 60 formed with the apparatus 100 of any one of embodiments 1 to 35.

37. A particle-containing filter 60 comprising: an inner filter tubular member 50, said inner filter tubular member 50 having a tubular member outer surface 54, a tubular member inner surface 55, and a plurality of apertures 56 extending through said inner filter tubular member 50 from said tubular member outer surface 54 to said tubular member inner surface 55; and alternating layers of (i) fibrous material 62 and (ii) particles 61 along at least a portion of said tubular member outer surface 54.

38. The particle-containing filter 60 of embodiment 37, wherein said inner filter tubular member 50 has an overall length $S_L$ of from about 10 cm to about 100 cm.

39. The particle-containing filter 60 of embodiment 37 or 38, wherein said plurality of apertures 56 represent from about 10% to about 90% of a total inner surface area comprising (i) a surface area of said tubular member inner surface 55 and (ii) a surface area of said plurality of apertures 56.

40. The particle-containing filter 60 of any one of embodiments 37 to 39, wherein said inner filter tubular member 50 comprises a polymeric material.

41. The particle-containing filter 60 of any one of embodiments 37 to 40, wherein said inner filter tubular member 50 comprises polyethylene, polypropylene or other polymeric material.

42. The particle-containing filter 60 of any one of embodiments 37 to 41, wherein said alternating layers of (i) fibrous material 62 and (ii) particles 61 have a basis weight of from about 2.0 grams (g) to about 12.0 g per linear cm of said filter 60.

43. The particle-containing filter 60 of any one of embodiments 37 to 42, wherein said alternating layers of (i) fibrous material 62 and (ii) particles 61 have a basis weight of from about 5.0 g to about 7.0 g per linear cm of said filter 60.

44. The particle-containing filter 60 of any one of embodiments 37 to 43, wherein said alternating layers comprises an outmost layer of particles 61.

Figure 7:
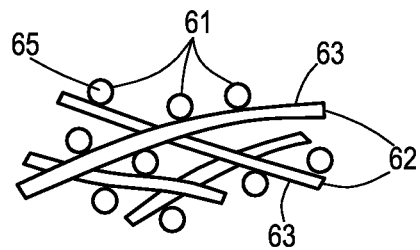
FIG. 7 depicts a close-up view of a portion of the exemplary particle- and fiber-containing material shown in FIG. 5 as viewed within circle 7 shown in FIG. 5.

45. The particle-containing filter 60 of any one of embodiments 37 to 44, wherein said alternating layers comprises an outmost layer of particles 61, and said particles 61 within said outermost layer have an average particle exposure of at least about 20% of an average particle outer surface area. See, for example, FIG. 7, which shows particles 61 adhered to outer surfaces 63 of fibrous material 62. As shown in FIG. 7, particles 61 are adhered to outer surfaces 63 of fibrous material 62 so that a significant portion (e.g., at least about 20% or about 30% or any percent between about 20 and about 90%, in increments of 0.1%, of an average particle outer surface area) of the outer surface 65 of a given particle 61 is not embedded within fibrous material 62.

46. The particle-containing filter 60 of any one of embodiments 37 to 45, wherein said alternating layers comprise an outmost layer of particles 61, and said particles 61 within said outermost layer have an average particle exposure of at least 50% of an average particle outer surface area. It should be noted that in other embodiments, the outermost layer of the particle-containing filter 60 may be substantially free of particles 61, and comprise essentially 100% fibers 62.

47. The particle-containing filter 60 of any one of embodiments 37 to 46, wherein said particles 61 have a basis weight of from about 0.3 g to about 7.0 g per linear cm of said filter 60.

48. The particle-containing filter 60 of any one of embodiments 37 to 47, wherein said particles 61 have a basis weight of from about 1.0 g to about 2.0 g per linear cm of said filter 60.

49. The particle-containing filter 60 of any one of embodiments 37 to 48, wherein said particles 61 have an average particle size ranging up to about 100.0 microns (µm).

50. The particle-containing filter 60 of any one of embodiments 37 to 49, wherein said particles 61 have an average particle size ranging from about 1.0 µm to about 5.0 µm.

51. The particle-containing filter 60 of any one of embodiments 37 to 50, wherein said filter 60 has a pressure drop across said filter 60 ranging from about 1.0 pounds per square inch (psi) to about 30.0 psi.

52. The particle-containing filter 60 of any one of embodiments 37 to 51, wherein said filter 60 has a chlorine removal capacity of up to 1.0 g of chlorine per g of particle 61.

53. The particle-containing filter 60 of any one of embodiments 37 to 52, wherein said particles 61 comprise carbon particles 61, baking soda particles 61, resin particles 61, or any combination thereof.

54. The particle-containing filter 60 of any one of embodiments 37 to 53, wherein said particles 61 comprise carbon particles 61.

55. The particle-containing filter 60 of any one of embodiments 37 to 54 formed using the apparatus 100 of any one of embodiments 1 to 35.

Methods of Making Particle-Containing Filters

56. A method of making the particle-containing filter 60 of any one of embodiments 36 to 55 using the apparatus 100 of any one of embodiments 1 to 35.

59. A method of making a particle- and fiber-containing material 200, said method comprising: depositing fibrous material 62 onto a substrate 50 so as to form a fiber-coated substrate 60; passing the fiber-coated substrate 60 through a particle cloud contained within a particle deposition housing 10 to enable contact and adhesion between (i) deposited fibrous material 62 and (ii) particles 61 of the particle cloud; and optionally repeating each of said depositing and passing steps up to 100 times.

60. The method of embodiment 59, wherein said depositing step comprises extruding the fibrous material 62 from at least one fiber deposition device 30 comprises one or more fiber-extruding dies 31.

61. The method of embodiment 59 or 60, wherein said depositing step comprises extruding the fibrous material 62 from at least one fiber deposition device 30 comprising one or more melt-blown fiber dies 31.

62. The method of any one of embodiments 59 to 61, wherein said depositing step comprises extruding the fibrous material 62 from a single melt-blown fiber die 31.

63. The method of any one of embodiments 59 to 62, wherein said passing step comprises moving the fiber-coated substrate 60 through a particle cloud contained within a particle deposition housing 10, the particle deposition housing 10 comprising a housing volume 11 surrounded by (i) one or more housing walls 12, (ii) a particle inlet 13, (iii) a particle outlet 14, (iv) a housing inlet 15 on a first side 16 of said housing 10, and (v) a housing outlet 17 on a second side 18, the housing inlet 15 and outlet 17 being separated from one another by a wall portion 19 of the one or more housing walls 12 and a housing volume portion 120 of the housing volume 11.

64. The method of any one of embodiments 59 to 63, further comprising: forcing the particle cloud through the particle deposition housing 10.

65. The method of any one of embodiments 59 to 64, further comprising: circulating the particle cloud through the particle deposition housing 10 via conduit 21/22 connecting a particle outlet 14 to a particle inlet 13 of the particle deposition housing 10.

66. The method of any one of embodiments 59 to 65, further comprising: heating the particle cloud prior to the particle cloud entering the particle deposition housing 10.

67. The method of any one of embodiments 59 to 66, further comprising: moving a substrate 50 (i) pass at least one fiber deposition device 30 so as to deposit fibrous material 62 onto the substrate 50, and (ii) through the particle deposition housing 10.

68. The method of any one of embodiments 59 to 67, further comprising: moving the particle- and fiber-containing material 200 from the particle deposition housing 10 to a packaging station 70.

69. The method of any one of embodiments 59 to 68, further comprising: packaging the particle- and fiber-containing material 200.

70. The method of any one of embodiments 59 to 69, wherein the particles 61 comprise carbon particles 61, baking soda particles 61, resin particles 61, or any combination thereof.

71. The method of any one of embodiments 59 to 70, wherein the particles 61 comprise carbon particles 61.

72. The method of any one of embodiments 59 to 71, wherein the particle- and fiber-containing material 200 is formed using the apparatus 100 of any one of embodiments 1 to 35.

73. The method of any one of embodiments 59 to 72, wherein the particle- and fiber-containing material 200 comprises a filter 60.

74. The method of any one of embodiments 59 to 73, wherein the particle- and fiber-containing material 200 comprises the particle-containing filter 60 of any one of embodiments 36 to 55.

Methods of Using Particle-Containing Filters

57. A method of using the particle-containing filter 60 of any one of embodiments 37 to 55, said method comprising: passing a fluid (not shown) through the alternating layers 61/62 of the filter 60.

58. The method of embodiment 57, wherein the fluid comprises water.

In addition, it should be understood that although the above-described apparatus, apparatus components, methods, and/or particle- and fiber-containing materials are described as "comprising" one or more components or steps, the above-described apparatus, apparatus components, methods, and/or particle- and fiber-containing materials may "comprise," "consists of," or "consist essentially of" the above-described components or steps of the apparatus, apparatus components, methods, and/or particle- and fiber-containing materials. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, an apparatus, an apparatus component, a method, and/or a particle- and fiber-containing material that "comprises" a list of elements (e.g., components or steps) is not necessarily limited to only those elements (or components or steps), but may include other elements (or components or steps) not expressly listed or inherent to the apparatus, apparatus component, method, and/or particle- and fiber-containing material.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define an apparatus, an apparatus component, a method, and/or a particle- and fiber-containing material that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described an apparatus, apparatus components, methods, and/or particle- and fiber-containing materials may comprise, consist essentially of, or consist of any of the herein-described components and features, as shown in the figures with or without any feature(s) not shown in the figures. In other words, in some embodiments, the apparatus, apparatus component, method, and/or particle- and fiber-containing material of the present invention does not have any additional features/steps other than those shown in the figures, and such additional features, not shown in the figures, are specifically excluded from the apparatus, apparatus component, method, and/or particle- and fiber-containing material. In other embodiments, the apparatus, apparatus component, method, and/or particle- and fiber-containing material of the present invention does have one or more additional features that are not shown in the figures.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Example 1

Method of Making a Particle- and Fiber-Containing Material

Particle- and fiber-containing materials (e.g., filters) were formed using an apparatus similar to exemplary apparatus 100 shown in FIGS. 1-18. In one example, particle- and fiber-containing materials 200 similar to exemplary coated substrates 60 (e.g., in the form of a carbon particle-containing filter) were formed.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. An apparatus for forming a particle- and fiber-containing material, said apparatus comprising:
    a particle deposition housing, said particle deposition housing comprising a housing volume surrounded by (i) one or more housing walls, (ii) a particle inlet, (iii) a particle outlet, (iv) a housing inlet on a first side of said housing, and (v) a housing outlet on a second side, said housing inlet and outlet being separated from one another by a wall portion of said one or more housing walls and a housing volume portion of said housing volume;
    a particle moving device, said particle moving device comprising one or more components that enable movement of free-flowing particles into said particle inlet;
    at least one fiber deposition device positioned outside of said particle deposition housing and proximate (i) said housing inlet, (ii) said housing outlet, or (iii) both of said housing inlet and said housing outlet; and
    a substrate moving device, said substrate moving device comprising one or more components that enable movement of a substrate (i) thru said housing inlet, (ii) thru said housing volume portion, (iii) thru said housing outlet, and (iv) pass said at least one fiber deposition device so as to (i) deposit fibrous material onto the substrate and (ii) form a coated substrate,
    wherein said substrate moving device further enables rotation of the substrate along an axis extending (i) thru the substrate and along a length direction of the substrate, (ii) thru said housing inlet, (iii) thru said housing volume portion, and (iv) thru said housing outlet.

2. The apparatus of claim 1, wherein said particle deposition housing comprises a housing length of up to about 2.0 meters (m), a housing width of up to about 2.0 m, and a housing height of up to about 100 centimeters (cm), and said housing inlet is separated from said housing outlet by said housing length.

3. The apparatus of claim 1, wherein each of said housing inlet and said housing outlet is lined with an aperture-forming barrier material, said aperture-forming barrier material comprising (i) a barrier material outer periphery bound to said particle deposition housing and (ii) an aperture-forming portion surrounded by said barrier material outer periphery.

4. The apparatus of claim 1, wherein said particle moving device comprises (i) a first conduit connected to said particle inlet and (ii) a second conduit connected to said particle outlet, wherein said first and second conduits form a continuous loop of conduit.

5. The apparatus of claim 4, wherein said particle moving device comprises a motor-driven multi-fan unit capable of moving a particle cloud through said first and second conduits.

6. The apparatus of claim 1, wherein said particle moving device comprises a particle storage housing, said particle storage housing being connectable to said apparatus so as to be in fluid communication with said particle inlet.

7. The apparatus of claim 6, wherein said particle moving device further comprises a particle heater, said particle heater being positioned to heat particles within said particle storage housing or at a location between said particle storage housing and said particle inlet.

8. The apparatus of claim 1, wherein said at least one fiber deposition device is positioned proximate said housing inlet, and comprises one or more fiber-extruding dies.

9. The apparatus of claim 1, wherein said substrate moving device comprises one or more components that enable movement of a substrate in a first direction and in a second direction, said second direction being opposite said first direction.

10. The apparatus of claim 1, wherein said substrate moving device comprises substrate connecting components, said substrate connecting components being capable of connecting to opposite ends of a substrate.

11. The apparatus of claim 1, wherein said substrate comprises a filter inner tubular member, said inner filter tubular member having a tubular member outer surface, a tubular member inner surface, and a plurality of apertures extending through said inner filter tubular member from said tubular member outer surface to said tubular member inner surface.

12. The apparatus of claim 1, wherein said apparatus applies carbon particles, baking soda particles, zeolite particles, cyclodextrin particles, polymer or copolymeric particles, cryogenically ground thermoplastic particles, copolyester or copolyamide or thermoset material particles, or any combination thereof onto said substrate.

13. The apparatus claim 1, wherein said apparatus applies carbon particles onto said substrate.

14. An apparatus for forming a particle- and fiber-containing material, said apparatus comprising:

a particle deposition housing, said particle deposition housing comprising a housing volume surrounded by (i) one or more housing walls, (ii) a particle inlet, (iii) a particle outlet, (iv) a housing inlet on a first side of said housing, and (v) a housing outlet on a second side, said housing inlet and outlet being separated from one another by a wall portion of said one or more housing walls and a housing volume portion of said housing volume;

a particle moving device, said particle moving device comprising one or more components that enable movement of free-flowing particles into said particle inlet;

a particle storage housing, said particle storage housing being connectable to said apparatus so as to be in fluid communication with said particle inlet;

a particle heater, said particle heater being positioned to heat particles within said particle storage housing or at a location between said particle storage housing and said particle inlet;

at least one fiber deposition device (1) positioned outside of said particle deposition housing and proximate (i) said housing inlet, (ii) said housing outlet, or (iii) both of said housing inlet and said housing outlet, and (2) comprising one or more fiber-extruding dies; and a substrate moving device, said substrate moving device comprising one or more components that enable movement of a substrate (i) thru said housing inlet, (ii) thru said housing volume portion, (iii) thru said housing outlet, and (iv) pass said at least one fiber deposition device so as to (i) deposit fibrous material onto the substrate and (ii) form a coated substrate, wherein said substrate moving device comprises one or more components that enable (1) movement of a substrate in a first direction and in a second direction, said second direction being opposite said first direction, and (2) rotation of the substrate along an axis extending (i) thru the substrate and along a length direction of the substrate, (ii) thru said housing inlet, (iii) thru said housing volume portion, and (iv) thru said housing outlet.

15. The apparatus of claim 14, wherein said particle moving device comprises (i) a first conduit connected to said particle inlet, (ii) a second conduit connected to said particle outlet, wherein said first and second conduits form a continuous loop of conduit, and (iii) a motor-driven multi-fan unit capable of moving a particle cloud through said first and second conduits.

16. The apparatus claim 14, wherein said particle storage housing contains carbon particles, and said apparatus applies carbon particles onto said substrate.

17. An apparatus for forming a particle- and fiber-containing material, said apparatus comprising:

a particle deposition housing, said particle deposition housing comprising a housing volume surrounded by (i) one or more housing walls, (ii) a particle inlet, (iii) a particle outlet, (iv) a housing inlet on a first side of said housing, and (v) a housing outlet on a second side, said housing inlet and outlet being separated from one another by a wall portion of said one or more housing walls and a housing volume portion of said housing volume;

a particle moving device, said particle moving device comprising one or more components that enable movement of free-flowing particles into said particle inlet;

at least one fiber deposition device positioned outside of said particle deposition housing and proximate (i) said housing inlet, (ii) said housing outlet, or (iii) both of said housing inlet and said housing outlet; and a substrate moving device, said substrate moving device comprising one or more components that enable movement of a substrate (i) thru said housing inlet, (ii) thru said housing volume portion, (iii) thru said housing outlet, and (iv) pass said at least one fiber deposition device so as to (i) deposit fibrous material onto the substrate and (ii) form a coated substrate, wherein each of said housing inlet and said housing outlet is lined with an aperture-forming barrier material, said aperture-forming barrier material comprising (i) a barrier material outer periphery bound to said particle deposition housing and (ii) an aperture-forming portion surrounded by said barrier material outer periphery.

18. The apparatus claim 17, wherein said substrate moving device comprises one or more components that enable (1) movement of a substrate in a first direction and in a second direction, said second direction being opposite said first direction, and (2) rotation of the substrate along an axis extending (i) thru the substrate and along a length direction of the substrate, (ii) thru said housing inlet, (iii) thru said housing volume portion, and (iv) thru said housing outlet.

19. The apparatus claim 17, wherein said at least one fiber deposition device is positioned proximate said housing inlet, and comprises one or more fiber-extruding dies.

20. The apparatus claim 17, wherein said apparatus applies carbon particles onto said substrate.

* * * * *